United States Patent
Hueber et al.

(10) Patent No.: US 10,390,200 B2
(45) Date of Patent: Aug. 20, 2019

(54) METHOD AND SYSTEM FOR OPERATING A COMMUNICATIONS DEVICE THAT COMMUNICATES VIA INDUCTIVE COUPLING

(71) Applicant: NXP B.V., Eindhoven (NL)

(72) Inventors: Gernot Hueber, Linz (AT); Johannes Bruckbauer, Treubach (AT); Erich Merlin, Gratkorn (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/383,406

(22) Filed: Dec. 19, 2016

(65) Prior Publication Data

US 2018/0176712 A1    Jun. 21, 2018

(51) Int. Cl.
| | | |
|---|---|---|
| H04B 5/00 | (2006.01) | |
| H04W 4/80 | (2018.01) | |
| H04B 17/318 | (2015.01) | |

(52) U.S. Cl.
CPC ............ *H04W 4/80* (2018.02); *H04B 5/0031* (2013.01); *H04B 5/0075* (2013.01); *H04B 17/318* (2015.01); *H04B 5/0062* (2013.01)

(58) Field of Classification Search
None
See application file for complete search history.

(56) References Cited

U.S. PATENT DOCUMENTS

| | | | |
|---|---|---|---|
| 5,703,573 A * | 12/1997 | Fujimoto | G01S 13/82 340/10.3 |
| 6,760,434 B1 | 7/2004 | Rezvani et al. | |
| 6,799,015 B1 * | 9/2004 | Tiwari | G06K 19/0701 340/10.1 |
| 7,200,375 B2 | 4/2007 | Kottschlag et al. | |
| 7,268,644 B2 | 9/2007 | Kottschlag et al. | |
| 7,295,594 B1 | 11/2007 | Lohr | |
| 7,577,205 B1 | 8/2009 | Liu | |
| 8,013,600 B1 | 9/2011 | Yepez, III et al. | |
| 8,279,018 B1 | 10/2012 | Song et al. | |
| 8,817,184 B1 | 8/2014 | Amirkhany et al. | |
| 8,964,605 B1 | 2/2015 | Ansari | |
| 9,083,441 B2 | 7/2015 | Sahota et al. | |
| 9,293,797 B2 | 3/2016 | Kim et al. | |
| 9,727,812 B2 | 8/2017 | Forster | |

(Continued)

FOREIGN PATENT DOCUMENTS

| | | |
|---|---|---|
| EP | 2395673 A2 | 12/2011 |
| EP | 2752999 A1 | 7/2014 |

(Continued)

OTHER PUBLICATIONS

European Search Report, 17199033.6, dated May 3, 2018.

(Continued)

*Primary Examiner* — David Bilodeau (57) ABSTRACT

Embodiments of methods and systems for operating a communications device that communicates via inductive coupling are described. In an embodiment, a method for operating a communications device that communicates via inductive coupling involves obtaining transmission output power information related to the communications device and measuring a detuning condition based on the transmission output power information. Other embodiments are also described.

16 Claims, 8 Drawing Sheets

(56) References Cited

U.S. PATENT DOCUMENTS

| | | | |
|---|---|---|---|
| 9,960,735 B1 | 5/2018 | Ding et al. | |
| 9,985,732 B2 | 5/2018 | Cordier | |
| 2002/0097144 A1 | 7/2002 | Collins et al. | |
| 2004/0135622 A1* | 7/2004 | Masleid | G05F 7/00 327/540 |
| 2004/0174185 A1 | 9/2004 | Lin et al. | |
| 2005/0232300 A1 | 10/2005 | Stiscia et al. | |
| 2005/0259764 A1 | 11/2005 | Hung Lai et al. | |
| 2006/0132362 A1 | 6/2006 | Yuanzhu | |
| 2007/0293168 A1 | 12/2007 | Kottschlag et al. | |
| 2008/0186105 A1 | 8/2008 | Scuderi et al. | |
| 2010/0273441 A1* | 10/2010 | Dubash | H01Q 1/243 455/192.2 |
| 2011/0065398 A1 | 3/2011 | Liu et al. | |
| 2011/0068636 A1 | 3/2011 | Lee et al. | |
| 2011/0300800 A1* | 12/2011 | Wuidart | G06K 19/0701 455/41.1 |
| 2012/0056718 A1 | 3/2012 | Leutgeb et al. | |
| 2012/0092901 A1* | 4/2012 | Wuidart | G06K 19/0701 363/21.09 |
| 2012/0094610 A1 | 4/2012 | Lunden et al. | |
| 2012/0122461 A1 | 5/2012 | Hossain et al. | |
| 2012/0152938 A1 | 6/2012 | Nordh et al. | |
| 2012/0153732 A1 | 6/2012 | Kurs et al. | |
| 2012/0153835 A1 | 6/2012 | Su et al. | |
| 2013/0109330 A1 | 5/2013 | Sahota | |
| 2013/0258911 A1 | 10/2013 | Choksi | |
| 2013/0271342 A1* | 10/2013 | Shen | H04B 1/0458 343/861 |
| 2013/0328734 A1* | 12/2013 | Thind | H03H 7/40 343/745 |
| 2014/0044293 A1 | 2/2014 | Ganem et al. | |
| 2014/0050124 A1 | 2/2014 | Yang et al. | |
| 2014/0073243 A1 | 3/2014 | Hijioka et al. | |
| 2014/0080409 A1 | 3/2014 | Frankland et al. | |
| 2014/0101747 A1 | 4/2014 | Lu et al. | |
| 2014/0111023 A1 | 4/2014 | Kagami et al. | |
| 2014/0240057 A1 | 8/2014 | Low et al. | |
| 2014/0241556 A1 | 8/2014 | Larsen et al. | |
| 2014/0306780 A1 | 10/2014 | Lehtinen | |
| 2015/0022145 A1 | 1/2015 | Kim et al. | |
| 2015/0054453 A1 | 2/2015 | White, II et al. | |
| 2015/0061404 A1 | 3/2015 | Lamenza et al. | |
| 2015/0065065 A1 | 3/2015 | Rofougaran et al. | |
| 2015/0079903 A1* | 3/2015 | Song | G06K 7/10217 455/41.1 |
| 2015/0171919 A1 | 6/2015 | Ballantyne et al. | |
| 2015/0215937 A1 | 7/2015 | Khandani | |
| 2015/0270876 A1 | 9/2015 | Kim et al. | |
| 2015/0280443 A1 | 10/2015 | Vladan et al. | |
| 2015/0280444 A1 | 10/2015 | Smith et al. | |
| 2015/0303997 A1* | 10/2015 | Dhayni | G06K 7/10128 340/10.1 |
| 2016/0100312 A1 | 4/2016 | Bell et al. | |
| 2016/0112146 A1 | 4/2016 | Lau et al. | |
| 2016/0142109 A1 | 5/2016 | Kumar et al. | |
| 2016/0172890 A1 | 6/2016 | Jeong | |
| 2016/0174267 A1 | 6/2016 | Mofidi et al. | |
| 2016/0197510 A1 | 7/2016 | Strömmer et al. | |
| 2016/0294227 A1 | 10/2016 | Podkamien et al. | |
| 2016/0365737 A1 | 12/2016 | Vladan | |
| 2017/0001003 A1 | 1/2017 | Pivonka et al. | |
| 2017/0005533 A1 | 1/2017 | Zeine et al. | |
| 2017/0012590 A1 | 1/2017 | Fong et al. | |
| 2017/0093168 A1 | 3/2017 | Von Novak, III et al. | |
| 2017/0104468 A1* | 4/2017 | Kormann | H03H 7/38 |
| 2017/0110796 A1 | 4/2017 | Rokhsaz et al. | |
| 2017/0141620 A1 | 5/2017 | Zeine et al. | |
| 2017/0205481 A1 | 7/2017 | Kim et al. | |
| 2017/0230204 A1 | 8/2017 | Sivertsen | |
| 2017/0264322 A1 | 9/2017 | Greene et al. | |
| 2017/0270323 A1 | 9/2017 | Butler et al. | |
| 2017/0373541 A1 | 12/2017 | Shimokawa et al. | |
| 2018/0040953 A1 | 2/2018 | Gebhart et al. | |
| 2018/0054086 A1 | 2/2018 | Jung | |
| 2018/0102151 A1 | 4/2018 | Kim et al. | |
| 2018/0176711 A1 | 6/2018 | Hueber et al. | |
| 2019/0097687 A1 | 3/2019 | Hueber et al. | |

FOREIGN PATENT DOCUMENTS

| | | |
|---|---|---|
| EP | 2988427 A1 | 2/2016 |
| EP | 3156935 A1 | 4/2017 |
| WO | 2009015115 A1 | 1/2009 |

OTHER PUBLICATIONS

European Search Report, 17198699, dated Apr. 26, 2018.

Non-final Office Action for U.S. Appl. No. 15/715,027 dated Jun. 14, 2018, 13 pages.

Final Office Action for U.S. Appl. No. 15/715,027 dated Jan. 9, 2019, 11 pages.

E. Sartori, "Hybrid Transformers," IEEE Transactions on Parts, Materials and Packaging, vol. PMP-4, No. 3, Sep. 1968.

S. Abdelhalem, et al., "Hybrid Transformer-Based Tuneable Differential Duplexer in a 90-nm CMOS Process", IEEE Transactions on Microwave Theory and Techniques, vol. 61, No. 3, Mar. 2013.

Office action for related U.S. Appl. No. 15/383,382 (dated May 23, 2017).

Office action for related U.S. Appl. No. 15/383,382 (dated Oct. 20, 2017).

Office action for related U.S. Appl. No. 15/383,382 (dated Apr. 13, 2018).

Office action for related U.S. Appl. No. 15/383,382 (dated Oct. 9, 2016).

Office action for related U.S. Appl. No. 15/715,044 (dated Jul. 6, 2018).

Notice of Allowance for related U.S. Appl. No. 15/715,044 (dated Jan. 24, 2019).

U.S. Appl. No. 15/715,044.

"Circulators and Isolators, unique passive devices—Application Note—AN98035", Philips Semiconductors, 31 pgs., retrieved from the internet Mar. 19, 2019 at: http://f6csx.free.fr/techni/CIRCU/Circulateurs2.pdf (Mar. 1998).

Langwieser, R. et al. "A Modular UHF Reader Frontend for a Flexible RFID Testbed", Institute of Communciations and Radio-Frequency Engineering, Vienna University of Technology, 12 pgs, retrieved from the internet Mar. 19, 2019 at: https://www.eurasip.org/Proceedings/Ext/RFID2008/modular_UHF.pdf. (2008)

Reiskarimian, N. et al. "Magnetic-free non-reciprocity based on staggered commutation", Nature Communications; 10 pgs., retrieved from the internet at: https://www.nature.com/articles/ncomms11217.pdf (Apr. 2016).

Notice of Allowance for related U.S. Appl. No. 15/715,044 (dated Apr. 3, 2019), 13 pages.

Notice of Allowance for U.S Appl. No. 15/715,044 dated May 13, 2019, 14 pages.

Non-Final Office Action for U.S. Appl. No. 15/715,027 dated Jun. 11, 2019, 12 pages.

* cited by examiner

METHOD AND SYSTEM FOR OPERATING A COMMUNICATIONS DEVICE THAT COMMUNICATES VIA INDUCTIVE COUPLING

BACKGROUND

Communications devices can communicate with each other via inductive coupling. For example, near field communications (NFC) is a wireless technology based on radio frequency identification (RFID). NFC defines a wireless connection between two devices in close proximity to each other to exchange data between the two devices. For example, the data communications between a reader and a transponder typically are bi-directional and initialed by the reader, which generates a continuous magnetic field. RFID devices that utilize NFC typically can be configured for either passive load modulation (PLM) or active load modulation (ALM).

In a communications device that communicates via inductive coupling, a detuning condition can affect the performance of the communications device. For example, a detuning condition can affect power transfer, shift characteristics (e.g., resonant frequency and Q-factor) of a matching network of the communications device, and the load of the transmitter. However, a typical communications device that communicates via inductive coupling generally does not have a built-in ability to detect the detuning condition.

SUMMARY

Embodiments of methods and systems for operating a communications device that communicates via inductive coupling are described. In an embodiment, a method for operating a communications device that communicates via inductive coupling involves obtaining transmission output power information related to the communications device and measuring a detuning condition based on the transmission output power information. Other embodiments are also described.

In an embodiment, the method further involves obtaining a received signal strength indicator (RSSI) at the communications device. Measuring the detuning condition includes measuring the detuning condition based on the transmission output power information and the RSSI.

In an embodiment, the transmission output power information includes a transmitter current and a transmitter voltage within the communications device.

In an embodiment, the method further involves adjusting a transmitter configuration of the communications device in response to the detuning condition.

In an embodiment, obtaining the transmission output power information includes obtaining a transmitter current and a transmitter voltage within the communications device from a supply regulator of the communications device.

In an embodiment, obtaining the transmission output power information includes obtaining a transmitter current and a transmitter voltage within the communications device from a transmitter driver of the communications device.

In an embodiment, measuring the detuning condition based on the transmission output power information of the communications device includes generating a ratio between a transmitter impedance when a corresponding communications device is in close proximity to the communications device and a nominal transmitter impedance when there is not a corresponding communications device in close proximity to the communications device.

In an embodiment, measuring the detuning condition based on the transmission output power information of the communications device further includes generating a ratio between a receiver gain when a corresponding communications device is in close proximity to the communications device and a nominal receiver gain when there is not a corresponding communications device in close proximity to the communications device.

In an embodiment, measuring the detuning condition based on the transmission output power information of the communications device includes measuring the detuning condition based on the transmission output power information before transmitting a response message.

In an embodiment, a communications device that communicates via inductive coupling includes a system parameter sensor unit configured to obtain transmission output power information related to the communications device and a detuning condition measurement unit configured to measure a detuning condition based on the transmission output power information.

In an embodiment, the system parameter sensor unit is configured to obtain an RSSI at the communications device. The detuning condition measurement unit is configured to measure the detuning condition based on the transmission output power information and the RSSI.

In an embodiment, the transmission output power information includes a transmitter current and a transmitter voltage within the communications device.

In an embodiment, the communications device further includes a control unit configured to adjust a transmitter configuration of the communications device in response to the detuning condition.

In an embodiment, the system parameter sensor unit is configured to obtain a transmitter current and a transmitter voltage within the communications device from a supply regulator of the communications device.

In an embodiment, the system parameter sensor unit is configured to obtain a transmitter current and a transmitter voltage within the communications device from a transmitter driver of the communications device.

In an embodiment, the detuning condition measurement unit is configured to generate a ratio between a transmitter impedance when a corresponding communications device is in close proximity to the communications device and a nominal transmitter impedance when there is not a corresponding communications device in close proximity to the communications device.

In an embodiment, the detuning condition measurement unit is configured to generate a ratio between a receiver gain when a corresponding communications device is in close proximity to the communications device and a nominal receiver gain when there is not a corresponding communications device in close proximity to the communications device.

In an embodiment, the detuning condition measurement unit is configured to measure the detuning condition based on the transmission output power information before transmitting a response message In an embodiment, a method for operating a communications device that communicates via inductive coupling involves obtaining a transmitter current and a transmitter voltage within the communications device from a supply regulator of the communications device and an RSSI at the communications device and measuring a detuning condition based on the transmitter current and the transmitter voltage and the RSSI.

In an embodiment, measuring the detuning condition based on the transmission output power information of the communications device includes measuring the detuning condition based on the transmission output power information before transmitting a response message.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
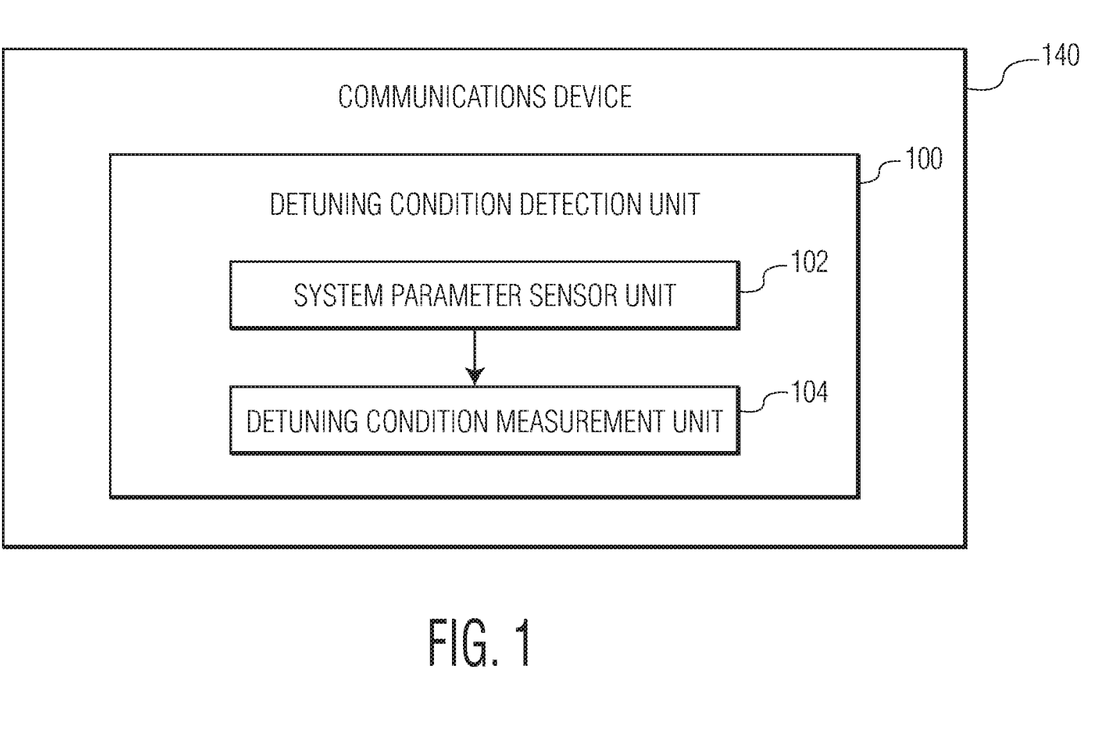
FIG. 1 is a functional block diagram of a communications device in accordance with an embodiment of the invention.

FIG. 1 is a functional block diagram of a communications device 140 in accordance with an embodiment of the invention. In the embodiment depicted in FIG. 1, the communications device communicates via inductive coupling. In some embodiments, the communications device may be a card/transponder device or the communications device may be in a "card-mode." In some other embodiments, the communications device may be a reader device or the communications device may be in a "reader mode." The communications device may include a detuning condition detection unit 100 configured to perform detuning condition detection for the communications device. In the embodiment depicted in FIG. 1, the detuning condition detection unit 100 includes a system parameter sensor unit 102 and a detuning condition measurement unit 104. The communications device may be an integrated circuit (IC) device. In some embodiments, the communications device is implemented in a handheld computing system or a mobile computing system, such as a mobile phone. The communications device may be a near field communications (NFC) device that utilizes inductive coupling to communicate. In some embodiments, the communications device is implemented as an RF transponder compatible with the ISO/IEC 14443 standard. Although the illustrated communications device is shown with certain components and described with certain functionality herein, other embodiments of the communications device may include fewer or more components to implement the same, less, or more functionality. In some embodiments, the communications device is an active load modulation (ALM) device. In such embodiments, the communications device can be configured to generate its own magnetic field for transmitting an outgoing RF signal using a current source, such as a battery, which results in greater communications distances compared to passive load modulation (PLM) systems.

In some embodiments, the detuning condition detection unit 100 can detect a detuning condition related to the communications device 140 based on one or more system parameters of the communications device. The communications device can perform various operations in response to the detected the detuning condition related to the communications device. The detuning condition detection unit can be used to adjust a transmitter configuration of the communications device. For example, the communications device can adjust a transmitter modulation configuration of the communications device, a transmitter impedance configuration of the communications device, and/or a transmitter output power configuration of the communications device to compensate for the detuning condition related to the communications device 140 to improve the overall system performance of the communications device. Consequently, the overall inductive coupling based communications performance of the communications device can be improved.

In the embodiment depicted in FIG. 1, the system parameter sensor unit 102 is used to obtain at least one system parameter related to the communications device 140. The system parameter sensor unit may be implemented as firmware, hardware and a combination of software, firmware, and/or hardware. In some embodiments, the system parameter sensor unit includes at least one sensor, for example, a voltage sensor or a current sensor. In some embodiments, the system parameter sensor unit obtains transmission output power information related to the communications device. The transmission output power information can be used to derive a transmitter detuning condition related to the communications device. The transmission output power information may include a transmitter voltage within the communications device and/or a transmitter current within the communications device. The system parameter sensor unit may also obtain a received signal strength indicator (RSSI) at the communications device. For example, the system parameter sensor unit may include an RSSI sensor configured to measure the signal amplitude of the received RF signal at the communications device to generate an RSSI. The RSSI can be used to derive a receiver detuning condition related to the communications device.

In the embodiment depicted in FIG. 1, the detuning condition measurement unit 104 is used to measure a detuning condition based on least one system parameter related to the communications device 140. The detuning condition measurement unit may be implemented as software, firmware, hardware and a combination of software, firmware, and/or hardware. In some embodiments, the detuning condition measurement unit includes at least one processor, for example, a microprocessor. In some embodiments, the detuning condition measurement unit measures a transmitter (TX) detuning condition related to the communications device based on the transmission output power information related to the communications device. In an embodiment, the detuning condition measurement unit generates a ratio between a transmitter impedance when a corresponding communications device (e.g., a reader device or a card/tag device) is in close proximity to the communications device (e.g., when a corresponding communications device is within the NFC communications range (e.g., 20 centimeters) of the communications device) and a nominal transmitter impedance when there is not a corresponding communications device in close proximity to the communications device (e.g., when a corresponding communications device is out of the NFC communications range (e.g., 20 centimeters) of the communications device). For example, the detuning condition measurement unit generates a ratio between a transmitter impedance when a corresponding communications device is within a predefined communications range of the communications device and a nominal transmitter impedance when there is no corresponding communications device within, for example, at least 10 times of the predefined communications range. In some embodiments, the detuning condition measurement may measure a receiver (RX) detuning condition related to the communications device based on the RSSI at the communications device. In an embodiment, the detuning condition measurement unit generates a ratio between a receiver gain when a corresponding communications device is in close proximity to the communications device (e.g., when a corresponding communications device is within the NFC communications range (e.g., 20 centimeters) of the communications device) and a nominal receiver gain when there is not a corresponding communications device in close proximity to the communications device (e.g., when a corresponding communications device is out of the NFC communications range (e.g., 20 centimeters) of the communications device). For example, the detuning condition measurement unit generates a ratio between a receiver gain when a corresponding communications device is within a predefined communications range of the communications device and a nominal receiver gain when there is no corresponding communications device within, for example, at least 10 times of the predefined communications range. In some embodiments, the detuning condition measurement unit may measure a system detuning condition related to the communications device based on the transmission output power information related to the communications device and the RSSI at the communications device.

Figure 2:
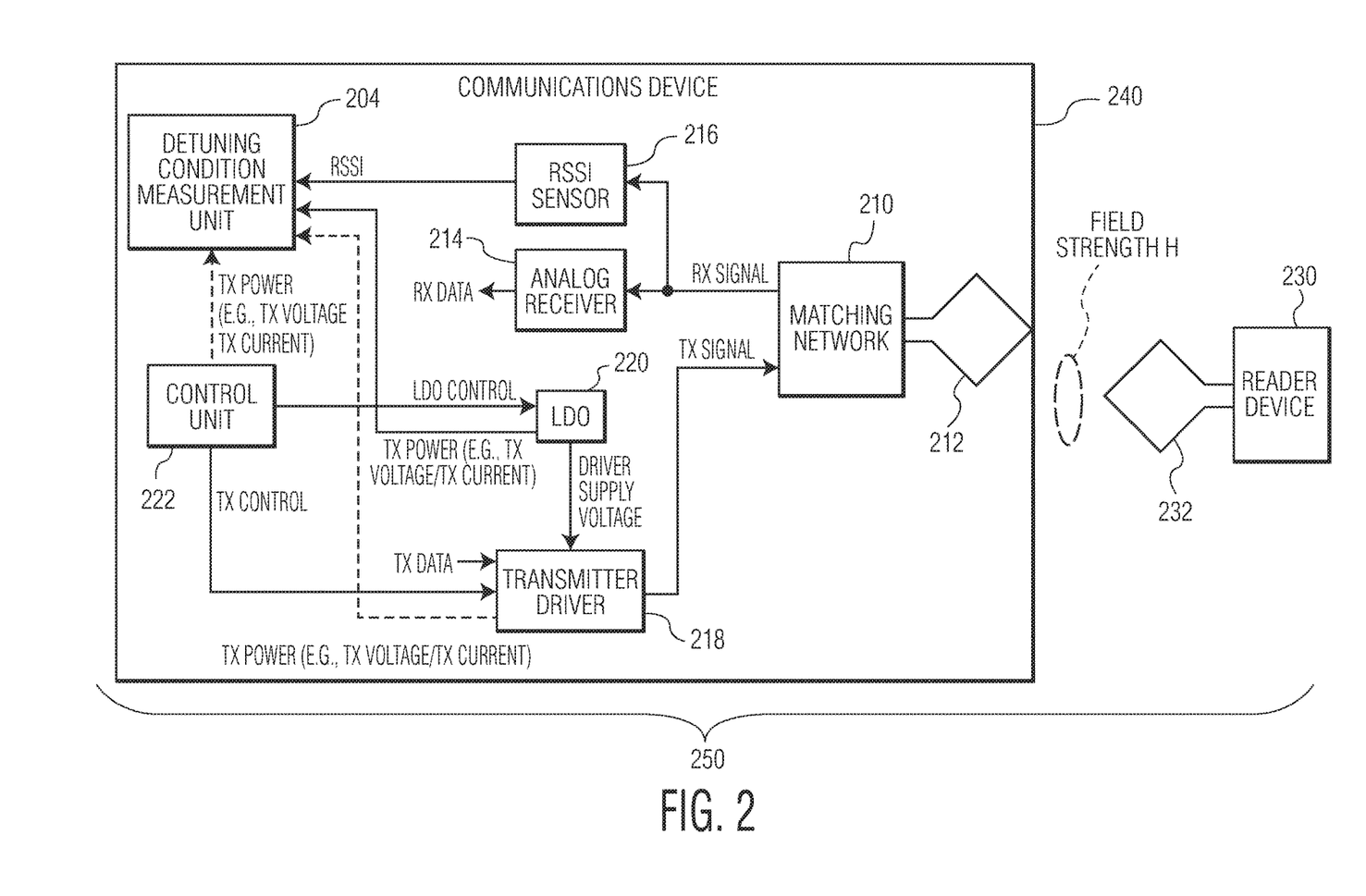
FIG. 2 depicts an embodiment of a communications device that can be used with a corresponding reader to form an inductively coupled communications system.

FIG. 2 depicts an embodiment of a communications device 240, similar to the communications device 140 depicted in FIG. 1, which can be used with a corresponding reader device 230 to form an inductively coupled communications system 250. The corresponding reader device may be a dedicated reader device or a communications device in reader-mode. In the embodiment depicted in FIG. 2, a communications device 240 includes a detuning condition measurement unit 204, a control unit 222, a matching network 210 that is coupled to an antenna 212, an analog receiver 214, a RSSI sensor 216 configured to measure the signal amplitude of the received RF signal (RX signal) to generate a received signal strength indicator (RSSI), an analog transmitter driver 218, and a low-dropout regulator (LDO) 220. The antenna may be an induction type antenna such as a loop antenna. In an example operation of the communications device, an RF signal (e.g., an RX signal) is received by the antenna via inductive coupling from an antenna 232 of the corresponding reader device and is passed to the analog receiver to convert the RF signal into a digital signal (e.g., RX data). A signal (e.g., TX data) is generated in response to the RF signal and is used to produce an outgoing RF signal (e.g., a TX signal) at the transmitter driver, which is transmitted via inductive coupling using the antenna. The communications device 240 depicted in FIG. 2 is one possible embodiment of the communications device 140 depicted in FIG. 1. However, the communications device depicted in FIG. 1 is not limited to the embodiment shown in FIG. 2. In some embodiments, the communications device 240 is an active load modulation (ALM) device. Although the communications device 240 is shown in FIG. 2 as including the LDO 222, in other embodiments, the communications device 240 includes other type of supply regulator (e.g., a DC-to-DC converter). In addition, although the communications device 240 is shown in FIG. 2 as being used with the corresponding reader device 230 to form the inductively coupled communications system 250, in other embodiments, the communications device 240 is in reader mode and is used with a corresponding card/tag device to form an inductively coupled communications system.

The detuning condition in the inductively coupled communications system 250 can affect multiple factors that have an effect on the system performance of the inductively coupled communications system. For example, a detuning condition can affect the load on the antenna 212 of the communications device 240 and hence the load on the transmitter driver 218. For a strongly detuned communications system, the load on the transmitter driver can be relatively low (e.g., lowered by 10 dB). Consequently, the current for the voltage controlled transmitter driver can increase, which will increase the driver current and power dissipation. The detuning condition can also affect the load on the receiver 214. For example, in the event of an increase in power at the matching network 210, the receiver might get overloaded and/or the receiver signal budget can change. The detuning condition can also affect the phase configuration of the communications device 240. For example, due to the change in the inductively coupled communications system caused by the detuning condition, the phase relation caused by the matching networks and antennas of the communications device 240 and the corresponding reader device 230 can change. For phase sensitive communication (e.g., ALM in FeliCa network, EMVCo LMA), the detuning condition can negatively affect the load modulation amplitude (LMA) performance. The detuning condition can also affect the frequency response of the inductively coupled communications system. For example, the detuning condition can impact the frequency response (resonant frequency, Q-factor) of the antenna/matching network of the communications device 240 and the corresponding reader device and consequently, affect the transferred signal (amplitude and phase) in both communication directions. The detuning condition in the inductively coupled communications system may be important for platforms with small antennas such as wearable devices and/or platforms with significant metal content that have a degrade in communication or power transfer performance even under normal (non-detuned) conditions.

Figure 3:
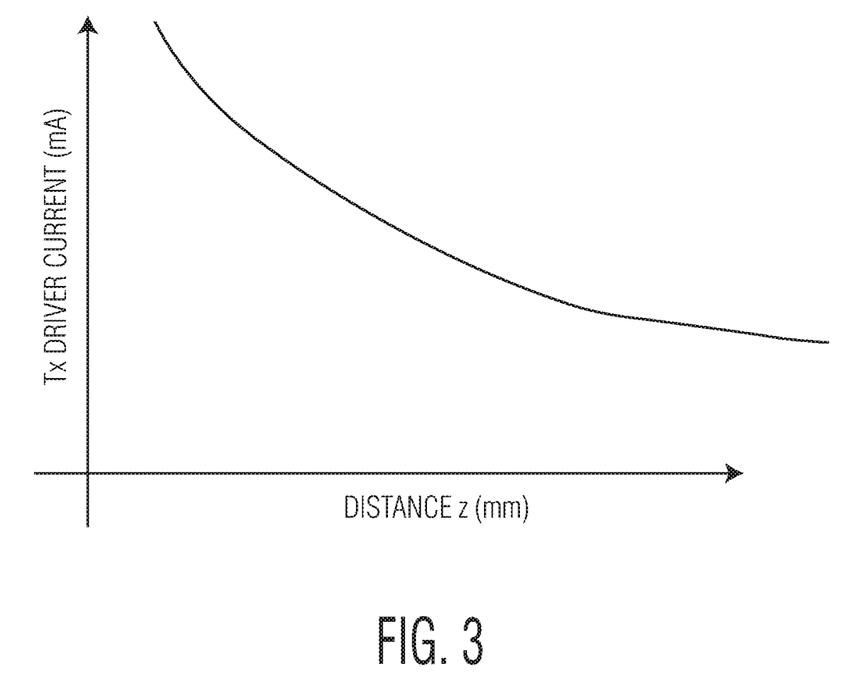
FIG. 3 illustrates a plot of transmitter current within the communications device depicted in FIG. 2 versus the distance between the communications device and the corresponding reader device depicted in FIG. 2.

The detuning condition measurement unit 204 can measure a transmitter (TX) detuning condition and/or a receiver (RX) detuning condition in the inductively coupled communications system 250. In some embodiments, the transmitter detuning condition is defined as a ratio between the actual transmitter impedance (with the reader device 230 in close proximity to the communications device 240) and the nominal transmitter impedance (without a reader in close proximity to the communications device). The transmitter detuning condition can be measured by the detuning condition measurement unit 204 based on transmitter (TX) power (e.g., transmitter (TX) voltage and/or transmitter (TX) current) during a transmitter operation. In some embodiments, the transmitter power information is assessed based on the transmitter voltage level that can be determined by the transmitter driver 218, the LDO 220 (e.g., automatic power control), and the control unit 222 and/or the transmitter current, which is measured by a current monitor of the transmitter driver, the LDO or the control unit. FIG. 3 illustrates a plot of transmitter (TX) current within the communications device 240 depicted in FIG. 2 versus the distance between the communications device and the corresponding reader device 230 depicted in FIG. 2. As illustrated in FIG. 3, the transmitter current decreases when the distance between the communications device and the corresponding reader device, "z," increases.

Figure 4:
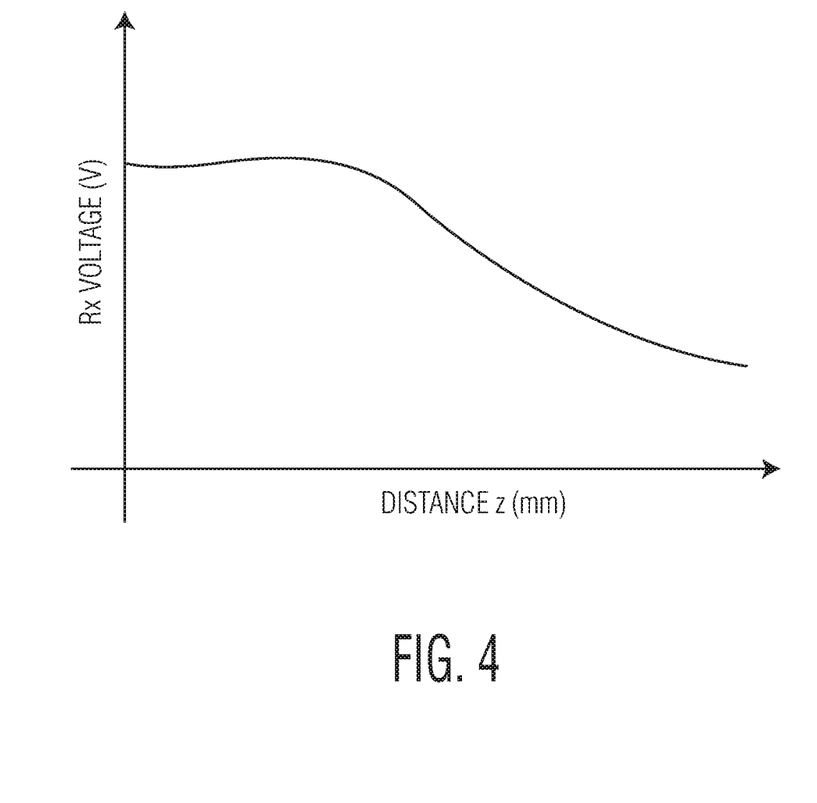
FIG. 4 illustrates a plot of the received signal voltage of the communications device depicted in FIG. 2 versus the distance between the communications device and the corresponding reader device depicted in FIG. 2.

In some embodiments, the receiver detuning condition is defined as a ratio of actual receiver gain (from reader source field to target receiver input) when a reader antenna is in close proximity to the communications device 240 versus a nominal receiver gain (from reader source field to target receiver input) when a reader antenna is not in close proximity to the communications device. The receiver detuning condition can be measured by the detuning condition measurement unit based on the receiver input level, which may be represented by the value of the RSSI, which is generated by the RSSI sensor 216. FIG. 4 illustrates a plot of the received signal voltage of the communications device 240 depicted in FIG. 2 versus the distance between the communications device and the corresponding reader device 230 depicted in FIG. 2. As illustrated in FIG. 4, the received signal voltage decreases as the distance between the communications device and the corresponding reader device, "z," increases. In some embodiments, the received signal voltage may saturate and stay constant or even decrease when the communications device is in close proximity to the corresponding reader device. In these embodiments, the receiver detuning condition can be detected based on one or more additional input signal parameters.

In some embodiments, the detuning condition measurement unit 204 can measure a transmitter/receiver detuning condition in the inductively coupled communications system 250 based on the transmitter power information and the value of the RSSI from the RSSI sensor 216. The combination of the transmitter power information and the value of the RSSI can provide information for the field strength, H, of inductive coupling (and in turn an estimate of the distance between the communications device 240 and the corresponding reader device 230), and an estimate of the transmitter/receiver detuning condition.

Figure 5:
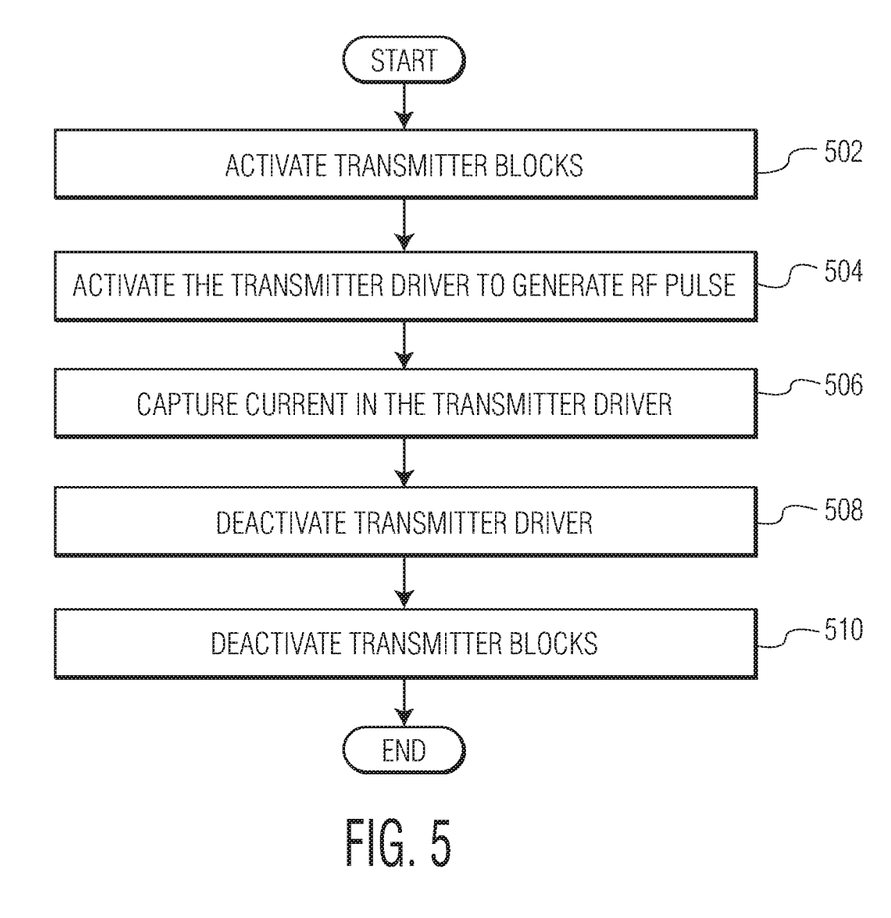
FIG. 5 is a process flow diagram of a method for accessing the transmitter current within the communications device depicted in FIG. 2.

In some embodiments, the control unit 222 enables a sequence of steps to activate the transmitter driver 218 and other components of the transmitter section of the communications device 240 to execute the measurement of the transmitter detuning condition. The control unit may be implemented as software, firmware, hardware and a combination of software, firmware, and/or hardware. In some embodiments, the control unit includes at least one processor, for example, a microprocessor. FIG. 5 is a process flow diagram of a method for accessing the transmitter current within the communications device depicted in FIG. 2. At block 502, transmitter blocks (e.g., transmitter phase-locked loop (PLL) and transmitter supply) are activated. For example, transmitter biasing is enabled, transmitter PLL is started and settled, and the transmitter supply is setup. At block 504, the transmitter driver is activated and an RF pulse is generated. At block 506, the transmitter current is captured in the transmitter driver. At block 508, the transmitter driver is deactivated. At block 510, transmitter blocks (e.g., transmitter PLL and transmitter supply) are deactivated.

In some embodiments, the control unit 222 adjusts a transmitter configuration of the communications device 240 in response to the detuning condition to compensate for the detuning condition. For example, the control unit can adjust a transmitter modulation configuration of the communications device, a transmitter impedance configuration of the communications device, and/or a transmitter output power configuration of the communications device to compensate for the detuning condition related to the communications device to improve the overall system performance of the communications device. Consequently, the overall inductive coupling based communications performance of the communications device can be improved.

Figure 6:
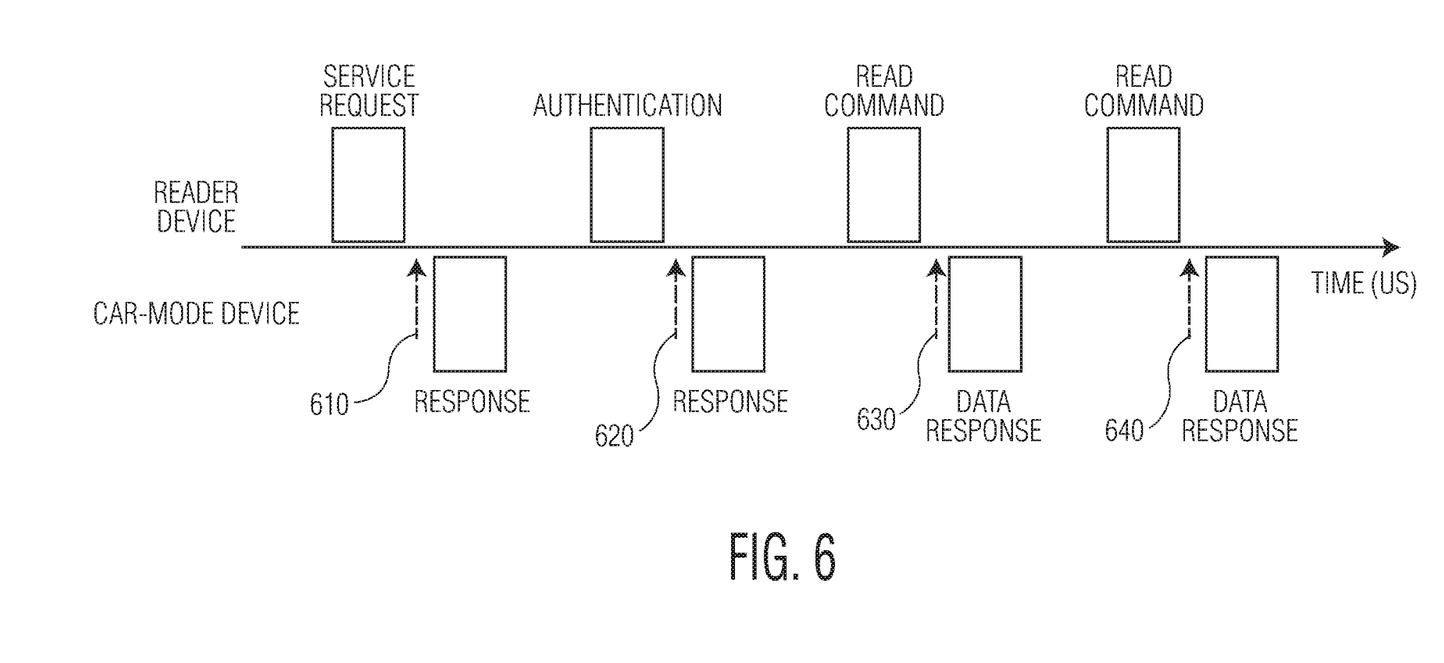
FIG. 6 depicts a sequence of commands received at the communications device depicted in FIG. 2 and a sequence of responses transmitted to the reader device by the communications device depicted in FIG. 2 during a transaction.

In some embodiments, when the communications device 240 is in reader mode, the measurement of the detuning condition is performed continuously as the communications device actively generates the RF field. In some embodiments, when the communications device is in card mode, the measurement of the detuning condition is performed intermittently to a transaction, based on a time-out and/or after the RF field is activated. FIG. 6 depicts a sequence of commands received at the communications device 240 depicted in FIG. 2 at reader-mode and a sequence of responses transmitted to the reader device 230 by the communications device depicted in FIG. 2 during a transaction. In the course of the transaction (e.g., a payment transaction), the measurement of the detuning condition may be performed immediately before transmitting a response message to the reader device, as represented by the respective arrows 610, 620, 630, and 640.

Figure 7:
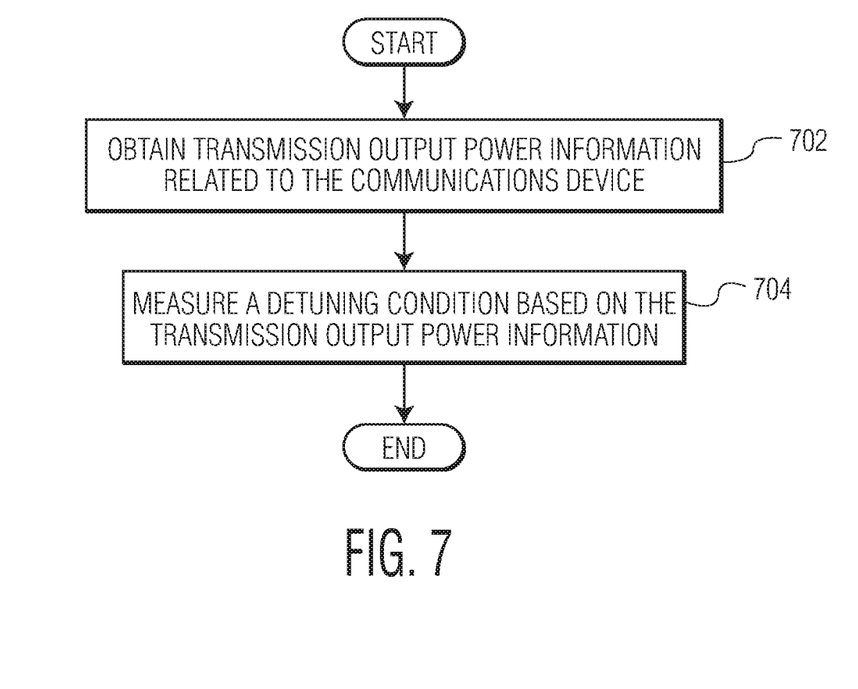
FIG. 7 is a process flow diagram of a method for operating a communications device that communicates via inductive coupling in accordance with an embodiment of the invention.

FIG. 7 is a process flow diagram of a method for operating a communications device that communicates via inductive coupling in accordance with an embodiment of the invention. At block 702, transmission output power information related to the communications device is obtained. At block 704, a detuning condition is measured based on the transmission output power information. The communications device may be the same or similar to the communications device 140 depicted in FIG. 1 and/or the communications device 240 depicted in FIG. 2.

Figure 8:
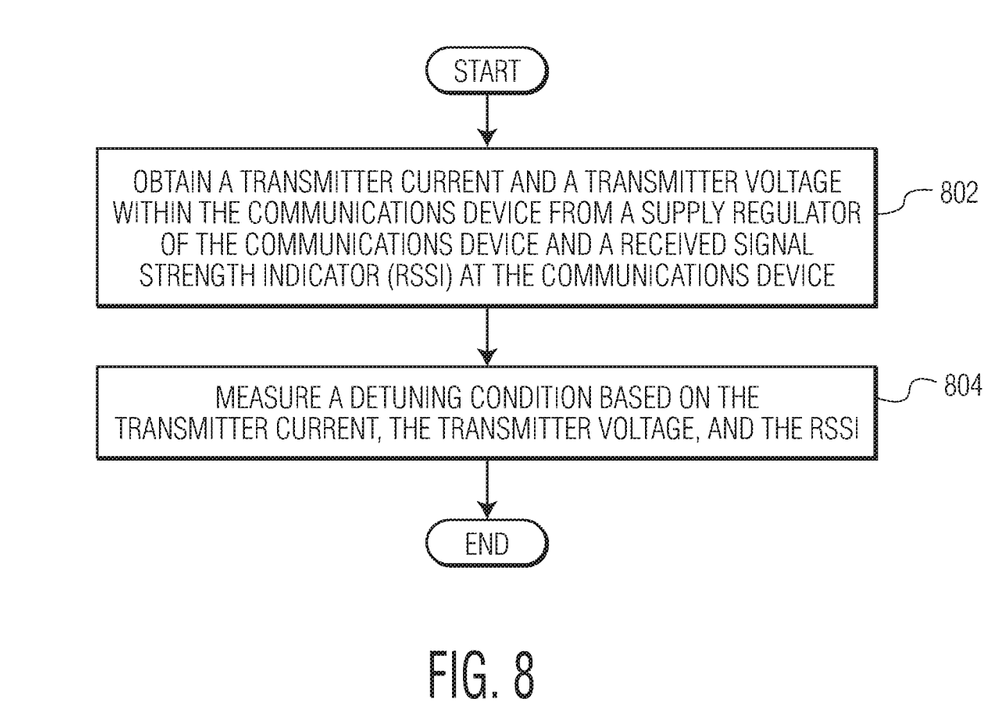
FIG. 8 is a process flow diagram of a method for operating a communications device that communicates via inductive coupling in accordance with another embodiment of the invention.

FIG. 8 is a process flow diagram of a method for operating a communications device that communicates via inductive coupling in accordance with another embodiment of the invention. At block 802, a transmitter current and a transmitter voltage within the communications device from a supply regulator of the communications device and a received signal strength indicator (RSSI) at the communications device are obtained. At block 804, a detuning condition is measured based on the transmitter current, the transmitter voltage, and the RSSI. The communications device may be the same or similar to the communications device 140 depicted in FIG. 1 and/or the communications device 240 depicted in FIG. 2.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for operating a communications device that communicates via inductive coupling, the method comprising:
    obtaining transmission output power information related to the communications device;
    obtaining a received signal strength indicator (RSSI) at the communications device; and
    measuring a detuning condition by estimating a field strength of inductive coupling based on a combination of the transmission output power information and the RSSI, and by generating a ratio between a transmitter impedance when a corresponding communications device is in close proximity to the communications device and a nominal transmitter impedance when there is not a corresponding communications device in close proximity to the communications device.

2. The method of claim 1, wherein the transmission output power information comprises a transmitter current and a transmitter voltage within the communications device.

3. The method of claim 1, further comprising adjusting a transmitter configuration of the communications device in response to the detuning condition.

4. The method of claim 1, wherein obtaining the transmission output power information comprises obtaining a transmitter current and a transmitter voltage within the communications device from a supply regulator of the communications device.

5. The method of claim 1, wherein obtaining the transmission output power information comprises obtaining a transmitter current and a transmitter voltage within the communications device from a transmitter driver of the communications device.

6. The method of claim 1, wherein measuring the detuning condition further comprises generating a ratio between a receiver gain when a corresponding communications device is in close proximity to the communications device and a nominal receiver gain when there is not a corresponding communications device in close proximity to the communications device.

7. The method of claim 1, wherein measuring the detuning condition comprises measuring the detuning condition before transmitting a message to a corresponding communications device.

8. A communications device that communicates via inductive coupling, the communications device comprising:
    a system parameter sensor unit configured to obtain transmission output power information related to the communications device and to obtain a received signal strength indicator (RSSI) at the communications device; and
    a detuning condition measurement unit configured to measure a detuning condition by estimating a field strength of inductive coupling based on a combination of the transmission output power information and the RSSI, and the detuning condition measurement unit configured to generate a ratio between a transmitter impedance when a corresponding communications device is in close proximity to the communications device and a nominal transmitter impedance when there is not a corresponding communications device in close proximity to the communications device.

9. The communications device of claim 8, wherein the transmission output power information comprises a transmitter current and a transmitter voltage within the communications device.

10. The communications device of claim 8, further comprising a control unit configured to adjust a transmitter configuration of the communications device in response to the detuning condition.

11. The communications device of claim 8, wherein the system parameter sensor unit is configured to obtain a transmitter current and a transmitter voltage within the communications device from a supply regulator of the communications device.

12. The communications device of claim 8, wherein the system parameter sensor unit is configured to obtain a transmitter current and a transmitter voltage within the communications device from a transmitter driver of the communications device.

13. The communications device of claim 8, wherein the detuning condition measurement unit is configured to generate a ratio between a receiver gain when a corresponding communications device is in close proximity to the communications device and a nominal receiver gain when there is not a corresponding communications device in close proximity to the communications device.

14. The communications device of claim 8, wherein the detuning condition measurement unit is configured to measure the detuning condition based on the transmission output power information before transmitting a message to a corresponding communications device.

15. A method for operating a communications device that communicates via inductive coupling, the method comprising:
    obtaining transmission output power information related to the communications device; and
    measuring a detuning condition based on the transmission output power information, wherein measuring the detuning condition based on the transmission output power information of the communications device comprises generating a ratio between a transmitter impedance when a corresponding communications device is in close proximity to the communications device and a nominal transmitter impedance when there is not a corresponding communications device in close proximity to the communications device.

16. The method of claim 14, wherein measuring the detuning condition based on the transmission output power information of the communications device further comprises generating a ratio between a receiver gain when a corresponding communications device is in close proximity to the communications device and a nominal receiver gain when there is not a corresponding communications device in close proximity to the communications device.

* * * * *